July 13, 1954  G. F. E. LOECK  2,683,397
HIGH APERTURE WIDE ANGLE THREE-COMPONENT PROJECTING LENS
Filed Nov. 3, 1952
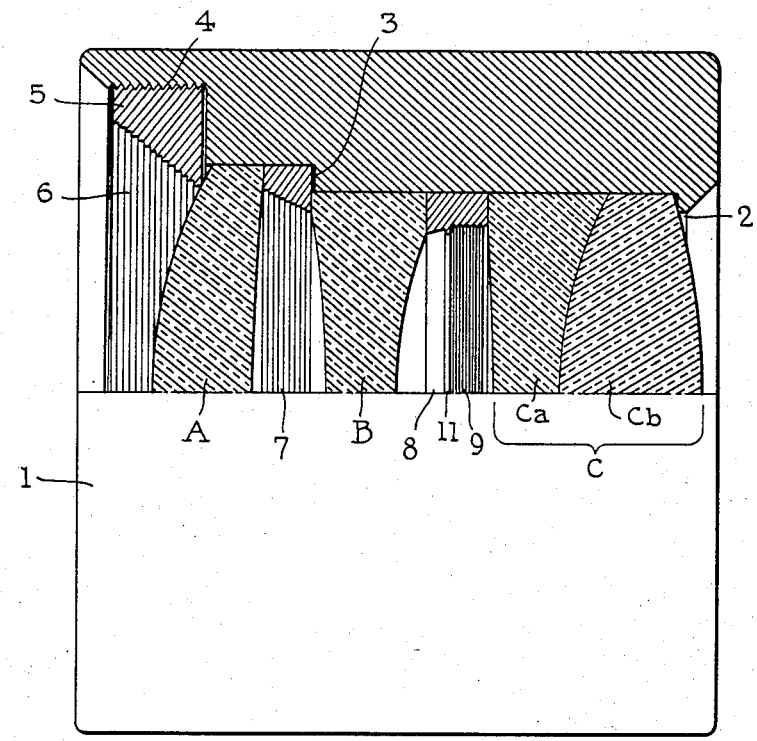
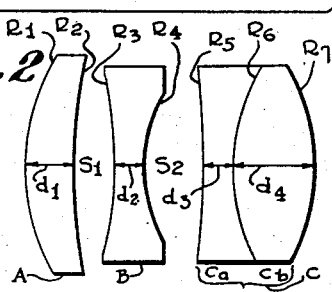
| | |
|---|---|
| $R_1 = +45$ | $d_1 = 9.5$ |
| $R_2 = +839$ | $S_1 = 7.5$ |
| $R_3 = -99$ | $d_2 = 6.5$ |
| $R_4 = +43$ | $S_2 = 9.5$ |
| $R_5 = -839$ | $d_3 = 6.5$ |
| $R_6 = +42$ | $d_4 = 13.5$ |
| $R_7 = -65$ | |
Lens A $n_D = 1.613$   Lens Ca $n_D = 1.531$
V = 59.5   V = 51.5
Lens B $n_D = 1.578$   Lens Cb $n_D = 1.613$
V = 41.5   V = 57.0
INVENTOR
Günther F. E. Loeck
ATTORNEYS Patented July 13, 1954

2,683,397

UNITED STATES PATENT OFFICE 2,683,397

HIGH-APERTURE WIDE ANGLE THREE-COMPONENT PROJECTING LENS

Günther F. E. Loeck, Troy, N. Y., assignor to W. & L. E. Gurley, Troy, N. Y., a corporation of New York Application November 3, 1952, Serial No. 318,486

2 Claims. (Cl. 88—57)

This invention relates to optics and provides a large-aperture projecting lens suited for use where excellent color correction, extremely wide angle, flat field, uniform and intense illumination, and use of readily available optical glasses are major considerations.

A field of use of great present commercial importance is in projecting backgrounds or scenery for television broadcasts. In such case projection is from a plane object, such as a transparency (slide or moving picture film) to a plane screen, usually translucent. The available space is commonly small, for the projector must as a practical matter be located behind the translucent screen on which the background is projected. Hence wide angle projection is vital. So are color correction, flat field, and uniformity and intensity of illumination.

Obviously the requirements are quite distinct from those which control the design of photographic lenses, even those of wide angle. The narrow angle projecting lenses used for moving picture projection cannot be used.

The invention will now be described by reference to the accompanying drawing, in which:

Fig. 1 is a view half in axial section and half in elevation of the essential lens components and the mount therefor.

Fig. 2 is a diagram of the lenses identified by the reference letters used in Fig. 1, but with cross hatching omitted to permit the application of identifying letters for radii, axial thicknesses and air spaces which are tabulated on the drawing and in the specification in millimeters. Values and $n_D$ and V for the various optical glasses used are also tabulated.

Such a system would be used with a suitable light source to illuminate the slide or other transparency. The slide would be positioned on, and normal to, the optical axis, and to the right of the lens system as it appears in the drawing, while the much larger translucent screen would be to the left of the lens system and also normal to the optical axis. The projection angle of the system can readily be made such that the diameter of the image is at least as great as the distance of the image from the lens.

The term "suitable light source" is intended to comprise any available source, with a condensing lens system, and with or without known means for intercepting or for dissipating heat (either or both). These details, and the slide and screen are conventional and are not a part of the invention, so require no illustration.

In describing the lens system, the term "front" means toward the projected image and the term "rear" means toward the object (i. e. the slide), The cylindrical mount 1 is bored to afford two shoulders 2 and 3 and is threaded at 4 to receive the lens retaining ring 5. This has the usual flared serrated surface 6.

The ring 5 holds the following components in assembled relation: front lens A which is positive; spacing ring 7 which has a flaring serrated inner surface, as shown; negative lens B; spacing ring 8 which has a serrated inner surface 9 and carries a diaphragm 11; and positive cemented doublet C made up of a negative lens Ca at the front and a positive lens Cb at the rear. The rear margin of the doublet C seats on shoulder 2. Doublet C, ring 8 and negative lens B are confined by the smaller bore and extend slightly beyond shoulder 3. Ring 7 and front lens A are confined by the larger bore, but do not engage shoulder 3. Hence ring 5 clamps all the lenses and both spacing rings between itself and shoulder 2.

To simplify discussion the definitive data for two successful embodiments will be given in detail. Dimensions will be given in millimeters. The glasses will be identified by their refractive index for the sodium line and dispersion it being understood that:

$n_D$ is refractive index for sodium line.
$n_F$ is refractive index for the green line.
$n_C$ is refractive index for the red line.

$$V = \frac{n_D - 1}{n_F - n_C}$$

$R$ = radius of curvature (front or rear as indicated).

The following tabulation gives the preferred values, most of which are also tabulated on the drawing for the convenience of searchers:

| | | | |
|---|---|---|---|
| $R_1 = +45$ | $d_1 = 9.5$ | $n_D = 1.613$ | $V = 59.5$ |
| $R_2 = +839$ | $s_1 = 7.5$ | air | |
| $R_3 = -99$ | $d_2 = 6.5$ | $n_D = 1.578$ | $V = 41.5$ |
| $R_4 = +43$ | $s_2 = 9.5$ | air | |
| $R_5 = -839$ | $d_3 = 6.5$ | $n_D = 1.531$ | $V = 51.5$ |
| $R_6 = +42$ | $d_4 = 13.5$ | $n_D = 1.613$ | $V = 57.0$ |
| $R_7 = -65$ | | | |

Focal lengths for the various lenses and combinations thereof are as follows:

| A | B | C | A+B | System |
|---|---|---|---|---|
| $f_A = +77$ | $f_B = -51$ | $f_C = +93$ | $f_{AB} = -426$ | $F = +150$ |

The system above described may be modified in several ways. For example, it is possible to substitute for the lens A a plano-convex lens whose front radius is +47.2. The same glass is used in the substituted lens as is used in lens A of the first embodiment and the remainder of the system remains unchanged.

Generally stated the system comprises three lenses, two positive lenses and an interposed negative lens. Only the rear positive lens is or need be a doublet, but the invention does not exclude construction of other lenses as doublets.

There are a number of significant relationships.

The focal length of the front lens is approximately half that of the system.

The radius of curvature of the rear face of lens A is preferably the same as the radius of curvature of the front face of the negative element $Ca$ of the doublet C as is the case in the first embodiment above described. This radius is much longer than any other in the system. The second embodiment does not have this feature of equality of radius. The limiting case is when both radii are infinite, i. e. the rear face of A and the front face of $Ca$ are plano.

The focal length of $A+B$ in the illustrated example is −426, and this is between four and five times the focal length 93 of doublet C a relationship which is believed to be the key to the attainment of wide angle.

Another significant relationship is that the thickness of lens B (5.6) is the same as the thickness of the negative component $Ca$ of the doublet, and approximately half the thickness of $Cb$ the positive element of the doublet. This relationship if adopted in a preliminary layout gives a good start for developing excellent correction of sine condition and correction of coma. As a practical matter in wide angle projection systems, the correction of sine condition is the vital factor.

The illustrated example gives excellent color correction, so that the projected image is free of troublesome color lines, despite the very high magnification. The light distribution over the entire area is well balanced.

Since adoption of the general relationships above pointed out will lead a person skilled in optics to satisfactory high aperture wide angle projecting systems, the invention is not limited to the specific example illustrated.

What is claimed is:

1. A wide-angle high-aperture lens system for use in projecting images of plane objects, said system comprising a series of lenses mounted on a common optical axis, namely a positive lens at the front of the series, a cemented positive doublet at the rear of the series, a negative lens located intermediate said positive lens and said doublet and a diaphragm centered on said axis and located between said negative lens and said doublet, the doublet comprising a forward negative lens and a rearward positive lens, said negative intermediate lens being separated from said positive lens and from said doublet by air spaces, the focal length of said positive front lens and said negative intermediate lens, considered as a doublet, is substantially 4.6 times the focal length of said cemented doublet and substantially 2.84 times the focal length of the system, and the center thickness of the intermediate negative lens and of the negative component of the doublet are substantially equal and are each substantially half the thickness of the positive element of the doublet and between 2% and 6% of the focal length of the system.

2. A wide-angle high-aperture lens system for use in projecting images of plane objects, said system comprising a series of lenses mounted on a common optical axis, namely a positive lens at the front of the series, a cemented positive doublet at the rear of the series, a negative lens located intermediate said positive lens and said doublet and a diaphragm centered on said axis and located between said negative lens and said doublet, the doublet comprising a forward negative lens and a rearward positive lens, said negative intermediate lens being separated from said positive lens and from said doublet by air spaces, said system being made substantially according to the following table:

| Lens | N | V | Radii | Thickness |
| --- | --- | --- | --- | --- |
| A | 1.613 | 59.5 | $R_1 = 0.300$ F | $d_1 = 0.0633$ F |
|   |       |      | $R_2 = 5.60$ F  | $s_1 = 0.0500$ F |
| B | 1.578 | 41.5 | $R_3 = 0.660$ F | $d_2 = 0.0433$ F |
|   |       |      | $R_4 = 0.286$ F | $s_2 = 0.0633$ F |
| $C_a$ | 1.531 | 51.5 | $R_5 = 5.60$ F | $d_3 = 0.0433$ F |
| $C_b$ | 1.613 | 57.0 | $\left.\begin{array}{c}R_6\\R_6\end{array}\right\} = 0.280$ F | $d_4 = 0.0900$ F |
|   |       |      | $R_7 = 0.433$ F |   | where the first column letters designate the lens elements in order from front to rear, the second and third columns give the corresponding refractive indices N and for the D spectral line and the conventional dispersive index V, and the last two columns give the radii R, the thicknesses $d$ of the elements and the spaces $s$ between the elements each numbered by subscripts from front to rear, and where F is the focal length of the objective.

References Cited in the file of this patent

UNITED STATES PATENTS

| Number | Name | Date |
| --- | --- | --- |
| 1,558,073 | Bielicke | Oct. 20, 1925 |
| 1,741,947 | Merte | Dec. 31, 1929 |
| 1,924,527 | Tronnier | Aug. 29, 1933 |
| 2,084,714 | Tronnier | June 22, 1937 |
| 2,328,157 | Luneburg | Aug. 31, 1943 |
| 2,536,500 | Hinden | Jan. 2, 1951 |

Certificate of Correction

Patent No. 2,683,897                                  July 13, 1954

Günther F. E. Loeck

It is hereby certified that error appears in the printed specification of the above numbered patent requiring correction as follows:

Column 4, line 45, after "indices N" strike out "and";

and that the said Letters Patent should be read as corrected above.

Signed and sealed this 24th day of August, A. D. 1954.

[SEAL]

ARTHUR W. CROCKER,
*Assistant Commissioner of Patents.*